(12) United States Patent
Gellman

(10) Patent No.: US 9,652,800 B1
(45) Date of Patent: *May 16, 2017

(54) SELL-SIDE ICON

(71) Applicant: KNAPP INVESTMENT COMPANY LIMITED, Road Town (VG)

(72) Inventor: Peter Gellman, Highland Park, NJ (US)

(73) Assignee: KNAPP INVESTMENT COMPANY LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,080

(22) Filed: Dec. 23, 2013

Related U.S. Application Data

(60) Continuation of application No. 12/589,010, filed on Oct. 16, 2009, now Pat. No. 8,630,930, which is a division of application No. 09/949,915, filed on Sep. 12, 2001, now Pat. No. 7,624,051.

(60) Provisional application No. 60/233,629, filed on Sep. 18, 2000.

(51) Int. Cl.
*G06Q 20/00* (2012.01)
*G06Q 30/06* (2012.01)

(52) U.S. Cl.
CPC ..... *G06Q 30/0633* (2013.01); *G06Q 30/0641* (2013.01)

(58) Field of Classification Search
CPC .... G06Q 30/0241; G06Q 20/20; G06Q 40/00; G06Q 20/102; G06Q 20/382
USPC ............ 705/26.1, 27.1, 35, 40, 64, 14.4, 16
See application file for complete search history.

(56) References Cited

U.S. PATENT DOCUMENTS

| | | | | |
|---|---|---|---|---|
| 6,505,171 B1* | 1/2003 | Cohen | .................... | G06Q 30/06 |
| | | | | 235/380 |
| 7,103,566 B2* | 9/2006 | Silva et al. | .................. | 705/26.8 |
| 2001/0007099 A1* | 7/2001 | Rau | ......................... | G06Q 30/02 |
| | | | | 705/26.8 |
| 2001/0034658 A1* | 10/2001 | Silva | ................... | G06Q 30/0633 |
| | | | | 705/26.8 |
| 2001/0042010 A1* | 11/2001 | Hassell | ........................... | 705/14 |
| 2002/0038255 A1* | 3/2002 | Tarvydas | ............... | G06Q 30/06 |
| | | | | 705/26.43 |
| 2002/0161670 A1* | 10/2002 | Walker | .................... | G06Q 30/02 |
| | | | | 705/26.1 |
| 2003/0167222 A1* | 9/2003 | Mehrotra et al. | ................ | 705/37 |
| 2004/0031856 A1* | 2/2004 | Atsmon et al. | ............... | 235/492 |

* cited by examiner

*Primary Examiner* — Lalita M Hamilton
(74) *Attorney, Agent, or Firm* — Anova Law Group, PLLC

(57) ABSTRACT

A network-based reverse auction system value discovery system that involves at least four major customers: consumers, and the three sell-side customers bidder/sellers, product manufacturers, and advertisers who are not also product manufacturers. Initially, a shopping list is constructed containing e.g., widely available goods (WAGs). The shopping list is the base of the value discovery network and adds significant value for each of the four key customers. A sell-side icon may be used to add items to the shopping list.

18 Claims, 5 Drawing Sheets

SELL-SIDE ICON

CROSS-REFERENCE TO RELATED APPLICATIONS

This is a continuation of U.S. patent application Ser. No. 12/589,010 filed Oct. 16, 2009, which was a division of U.S. patent application Ser. No. 09/949,915 filed Sep. 12, 2001, which claimed the benefit of U.S. provisional application No. 60/233,629 filed Sep. 18, 2000.

BACKGROUND

There are many firms participating in on-line retailing of groceries, and that number will grow in the next few years. Current net-based grocery services include Peapod/Ahold, Groceryworks/Safeway, eGrocer, Priceline Webhouse. Peapod/Ahold and Groceryworks/Safeway mainly coordinate the delivery of groceries for consumers. The eGrocer service advertises end-to-end online business solutions for the grocery industry, including among other things software solutions, database management solutions, and web-hosting solutions. This service is available to individual grocery stores, who wish to offer their consumers on-line grocery shopping. This is not a value discovery tool. Priceline Webhouse, now discontinued, used "name your price" for groceries. Priceline's model was anti-discovery in that the consumer cannot solicit and compare bids; he/she must guess about best price and is committed if that offer is accepted. Priceline defined value as price, forcing the consumer to set aside issues like convenience, time, and future benefits. Focus on price also destroys brand equity, because consumers are encouraged to bid down the branded item. This is a coupon offer that undercuts the coupon's traditional narrow role of building ties between brand and the price-sensitive consumer.

Thus, there is a need in the art for a value-discovery network that revolutionizes and accelerates the market, and the Detailed Description section hereof discloses such a value-discovery network.

SUMMARY

The present invention is directed to the use of a sell-side icon for use in conjunction with stored shopping lists.

In illustrative embodiments of the invention, the sell-side icon may be used in the disclosed value-discovery network.

DESCRIPTION OF ILLUSTRATIVE EMBODIMENTS

Figure 1:
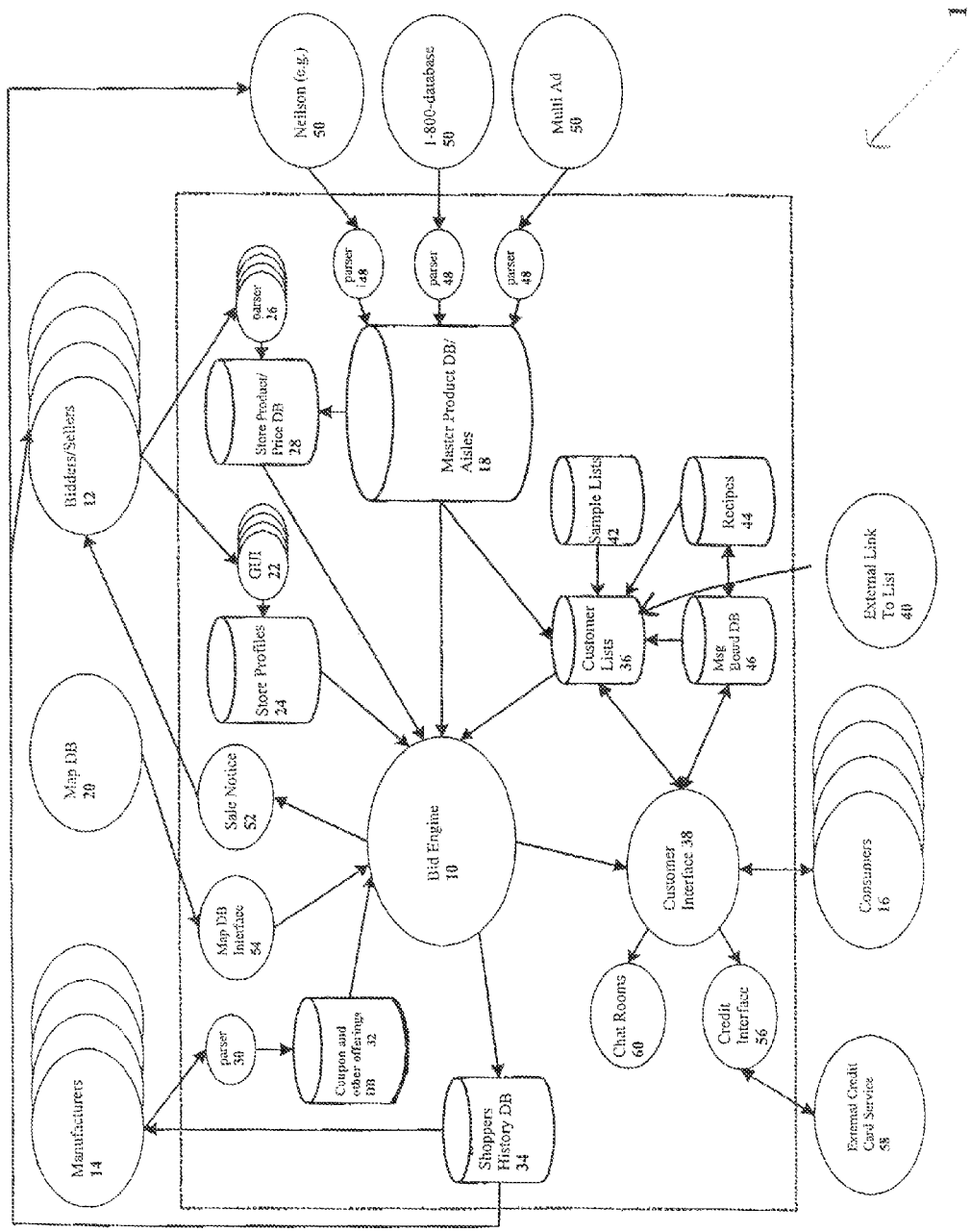
FIG. 1 is a system for practicing the methods of the invention according to an embodiment of the present invention.

Systems in which the present invention may be implemented speed up the disappearance of the economic lines between distributor and retailer and between categories of retail using a network that enables consumers to instantly navigate new ranges of choices for obtaining items on their shopping lists.

Systems in which the present invention may be implemented include a value discovery system including at least four major customers: shoppers or consumers (referred heretofore as "consumers"), and the three sell-side customers bidder/sellers, product manufacturers, and advertisers who are not also product manufacturers. Initially, a shopping list is constructed containing e.g., widely available goods (WAGs). The shopping list is the base of the value discovery network and ads significant value for each of the four key customers. For consumers, the value discovery system is an easy and convenient way to obtain and feel assured that they have obtained the best deal possible, consistent with their own definition of value. For bidder/sellers, the value discovery system offers a chance to sell products effectively, e.g., in a manner that maximizes profits while building customer relationships one by one. For product manufacturers, the value discovery system offers a buying channel where marketing and trade promotion of brands, categories, and relationships can be nurtured in direct relationships with customers and their shopping lists, unmediated by the conflicts and inefficiencies of conventional retail channels. For other advertisers, the data-rich value discovery facilitates communication with those who make important household spending decisions, enabling crafted, precise, messages to be delivered to the right audience.

The value discovery system's flexibility allows each segment of consumers to pursue its version of value. The price sensitive, coupon consumer and the consumer that craves their gourmet spaghetti sauces and coffee beans, both communicate those needs and receive customized responses from bidder/sellers, product manufacturers, and advertisers.

With the disclosed system, the consumer gains the clarity of seeing what his list of items is really worth when he/she solicits bids, compares them, and ranks them according to his/her preferences. Knowing what a list of twenty or more items is worth is a time-consuming, counterproductive task in the physical world. Online, using the value discovery system, the consumer finds out immediately. Using the value discovery system, the consumer also permits a group of bidder/sellers to compete for his/her business by making highly personal offers to the consumer that take account of the consumer's tastes and preferences. The consumer reaps both economic and psychological rewards by managing the market to serve his/her goal of maximizing value. And while the consumer's definition of value is paramount, auctions for WAGs, such as those found on a shopping list, increase the number of sellers, push prices lower, and challenge sellers to seek profitability through enhanced value propositions.

A feature of the disclosed system is that the consumer also enjoys the convenience of a permanent repository of his/her list or portfolio of lists (e.g., the weekly run, a monthly big purchase, a list for parties, recipes etc.) that makes the task of planning and submitting a shopping list extremely easy. The consumer has an increasing network of fellow consumers who provide communal benefits (e.g., sharing or posting a list, evaluating bidder/sellers, strategizing to maximize value received). The consumer has product manufacturers personalizing their promotional pitches to him/her. Further, the consumer may peruse virtual aisles containing an extensive universe of products and product information.

In the disclosed system, bidder/sellers gain access to a steady flow of motivated consumers eager to buy. Bidder/sellers use the progressively richer profiles of the consumers to deliver the greatest value to their most valuable customers. The value discovery system enables up-selling which is the process of moving the consumer in the direction of more profitable buying decisions. Over time, the cumulative experience of individualized offers yields to the bidder/seller a rich reservoir of data for both strategic and marketing purposes.

The value discovery system also offers retailers a variety of opportunities to increase profitability. For example, store brand and private label WAGs offer superior profit margins. Bidder/sellers can use, e.g., couponing, sampling, rewards, and a consumer's own willingness to accept private label substitution to increase the store brand component of the auction list. The value discovery system provides an online channel through which retailers can aggressively market selected types of goods. Further, the value discovery system also provides a supercharged, personalized, data-rich environment for loyalty or relationship-based programs. This allows bidder/sellers to execute more ambitious consumer acquisition and retention strategies. For example, in embodiments of the disclosed system, bidder/sellers offer discounts for consumers who choose fulfillment on slow days to smooth out traffic, and offer cash-back programs in return for a consumer's commitment to tender multiple lists during a given cycle.

The data-rich venue resulting from the value discovery system empowers product manufacturers to execute mass customization, one-to-one product promotion strategies. The value discovery system builds consumer profiles continuously and without interruption, due to the fact that a consumer's switch from one bidder/seller to another occurs within the value discovery network. As a result, a product manufacturer has opportunities to deepen its brand relationships with the consumer as well as to refine its alliance and marketing strategies with retailers and other bidder/sellers.

In the disclosed system, consumers define themselves through their creation of lists. Within the boundaries of pre-established privacy rules, the value discovery system allows marketers to respond directly to that self-definition. The granular, itemized character of a shopping list gives brand management an opportunity to deploy marketing tools and resources with focus and strong effect. For example, consumers whose shopping histories show strong price sensitivity are offered coupons. Similarly, consumers who focus on variety and quality or those looking for the quickest way to prepare meals are pitched with targeted messages and offers.

It is a further feature of the disclosed system that product placement within the virtual aisles is reconfigurable with every consumer. More particularly, shelf space configuration within the virtual aisle and category growth can be pursued directly; one consumer and one page view at a time. Where collaboration with retailers in the physical world imposes frictions and tradeoffs, on-line category management is unmediated and uncluttered.

Described below, there is a shopping list based value discovery network formed via a consumer to business auction process that realizes the revolutionary potential for buying on the Internet. Like a PC operating system, a networked, smart, shopping list (e.g., grocery list) is a platform for hosting a wide array of useful, time-saving activities for consumers and revenue-generating activities for sellers, manufacturers, and advertisers.

In an embodiment of the disclosed system, a shopping list and the selections indicated thereon, are visible to all consumers, giving bidder/sellers, product manufacturers, and advertisers an effective way to market to consumers.

In an embodiment of the disclosed system, shopping list-based value discovery is accomplished through a reverse auction or tender process. A consumer creates a list of desired items, and bidder/sellers compete to provide the best combination of price, selection, and convenience by bidding on the list. Utilizing the consumer created list information, product manufacturers or service providers can use the shopping list platform to market their particular products or services.

In an embodiment of the disclosed system, shopping list-based value discovery is accomplished through a reverse auction, or tender system and process. The reverse auction process is facilitated on a network platform, such as the Internet, through specially designed software and hardware (e.g., server) configurations. Each of the parties to the auction are able to login to the reverse auction system via appropriate hardware, e.g., personal computers (PCs), wireless or non-wireless personal digital assistants (PDAs), cellular phone, network appliances and any other appropriate merchant or customer terminals. Further, certain embodiments of the disclosed system are voice enabled, and run on a voice activated application. The state of the art is such that one skilled in the art is able to design appropriate software and hardware configurations to facilitate the processes described herein without undue experimentation.

FIG. 1 is an exemplary system schematic 1 for implementing the processes described herein. The system 1 includes a bid engine 10 which receives/retrieves information from at least, bidder/sellers 12, manufacturers 14, and consumers 16. Further, the bid engine 10 can receive/retrieve information from a master product database 18 and a mapping database (e.g., MapQuest) 20.

Store profile information from the bidders/sellers 12 can be entered by bidders/sellers through, for example, a graphical user interface 22 into a store profile database 24. The store profile database 24 is then accessed by the bid engine 10. Bidder/sellers' store product and price information may also be entered via a parser 26 into a store product and pricing database 28. Programs for parsing are well known to those skilled in the art. The store product and pricing database 28 is then accessed by the bid engine 10.

Manufacturers' information can be entered by manufacturers 14 via a parser 30 into, for example, a coupon and other offerings database 32 including coupon, incentive, and other offerings information, which is accessed by the bid engine 10. As discussed below, the manufacturers 14 retrieve information about consumer shopping preferences from the bid engine 10 through a consumer history database 34 and from this information, the manufacturers have the ability to formulate incentive coupon offerings.

Consumers 16 provide information to the bid engine 10 in the form of consumer lists stored in, for example, a consumer list database 36. The consumers 16 provide information to the consumer list database 36 through both on-line 38 and external 40 links. The on-line link 38 may be, for example, a consumer interface, which is also used to access external credit card services 58, through credit interface 56 and chat rooms 60. The consumer list database 36 is also fed information through a sample list database 42, a recipe database 44, and a message board database 46.

Finally, the bid engine 10 can receive/retrieve information from a master product database 18 which is fed information via parsers 48 from multiple product information sources 50, such as, Neilson, 1-800-database, and Multi Ad and from a mapping database 20, through a mapping database interface 54.

As discussed with reference to the manufacturers' information, the bid engine 10 also transmits information to, for example, the consumer history database 34, the on-line consumer interface 38, and the bidder/sellers 12 through sale notices 52 forming a feedback-type loop system for sharing information. The consumer history database 34 is also accessed by the bidder/sellers 12 and the multiple product information sources 50 as well as consumers themselves. Using the information from the consumer history database 34, when prompted by the consumer, the value discovery system offers consumers the ability to see the consumer's list and individual item histories. In a further embodiment, the value discovery system includes applications for organizing and analyzing history information into timelines, graphs, etc., in order to reflect a consumer's buying habits.

As discussed above, the value discovery system is a network. In particular embodiments of the disclosed system, the network takes core value propositions provided to the four principal customers, i.e., consumers, bidder/sellers, product manufacturers, and advertisers and infuses them with exponential, positive feedback qualities. Metcalfe's law posits that the value of a network is the square of its number of members. In accordance with an embodiment of the disclosed system, every new participant in a value discovery system makes the network experience more valuable for all existing participants. The next customer, choosing between the largest network with the greatest membership and a smaller one with few users, almost always concludes that a larger network is better. Once the identity of the leading network becomes clear, the expansion of the network occurs even faster, and the knowledge base expands accordingly.

More consumers mean more resources and experiences that consumers can share with each other for their mutual benefit. More consumers also mean more bidder/sellers, product manufacturers, and advertisers entering or increasing their activities within the network because the market is now more valuable. Greater choice and more efforts by the three sell-side customers to create value for the consumer in turn attracts even more consumers who in turn spend more of their time and resources on the value discovery network, and so on. The buy side and the sell side fuel each other's growth.

Figure 2:
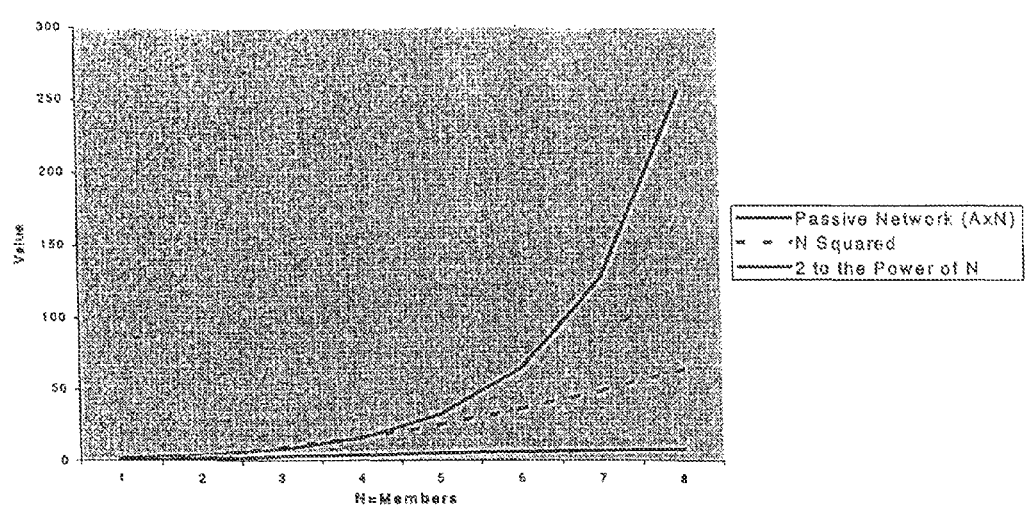
FIG. 2 is a graph of network values versus number of members according to an embodiment of the present invention.

Networks that empower community by enabling affiliations and associations among subsets of two or more of a network's members, also referred to as group forming networks (GFNs) create values of $2^n$. As FIG. 2 illustrates, $2^n$ is radically more valuable than a one (content distributed)-to-many passive network (e.g. a television network), or even Metcalfe's Law square of n valuation.

The disclosed value discovery system benefits from "network effects" such as the potential for GFNs. For example, a market based on WAGs in the form of, e.g., groceries, is a market that is large (approximately $460 billion annually at the time of filing this application), and is habitual or as it is often referred to in the market, sticky (2.1 shopping trips per family per week). It is also a market where bidder/sellers, advertisers, and product manufacturers are focused on building long-term affiliations with consumers, and where they already allocate large amounts of capital to acquire and maintain these relationships.

For advertising and product promotion, network growth also means that data capture and data-informed marketing are progressively more valuable. The value discovery system's effective compilation and analysis of usage patterns and trends assists advertisers and marketers in optimizing the focus of their respective advertising and marketing efforts.

In a first preferred embodiment, a consumer creates a list of desired items, and bidder/sellers can compete to provide the best combination of price, selection, and convenience by bidding on the list. The consumer may use any available means for creating the list of desired items. For example, the consumer can manually enter product names or manufacturer names into a search window provided on a webpage of the value discovery website and the value discovery server will provide a list of compiled products from which the consumer may select a particular product. Further, using optical scanning technology (e.g., CueCat from CRQ), the consumer can scan standard product codes (e.g., universal product code (UPC), International Standard Book Number (ISBN), Stock Keeping Unit (SKU)) provided on items and automatically add the corresponding product to his/her list. For example, if the consumer wishes to add shampoo to his/her list, the consumer retrieves the bottle and scans the standard product code with an optical reader/scanner to transmit the standard product code and consequently the product name, type, etc. to the list on the value discovery website. The consumer can also scan bar codes provided in magazines or newspapers in order to automatically add items to his/her shopping list.

In this first preferred embodiment, consumers are able to specify fulfillment preferences, including, brand preferences and/or the acceptability of substitutes, whether the consumer wishes to have the goods on the list pre-packaged for pick-up from the bidder/seller or delivered to the consumer, the radius within which the consumer is willing to travel to pick-up the goods on the list, store preferences, etc. In an embodiment of the disclosed system, the system's decision rules are designed to have a default brand or code for each product, such that when a consumer selects a product without specifying a brand name, this default brand is automatically selected by the system prior to submitting the list for auction. For example, if a consumer selects sugar as an item, the system may default to e.g., Domino's or alternatively, the system indicates that a generic brand is acceptable, in which case, most larger supermarkets offer their own label, e.g., Safeway, Giant, Kroger, etc. The system aids the consumer in creating the list in other ways as well. For example, the system is able to track previous lists made by individual consumers and make these lists available for automatic call-up by the individual consumer. The system also allows an individual consumer to keep multiple lists. Further, in an embodiment of the disclosed system, the system provides pre-formed sample lists that consumers can either use "as is" or amend to suit the consumer's particular needs. The sources for these pre-formed lists are unlimited. For example, other consumers may choose to share their specialty lists, such as, lists for diabetics, children, individuals with high cholesterol, special weight-loss diets, or individuals keeping kosher. Further, specialty lists may be provided by the other consumers of the system.

Figure 8:
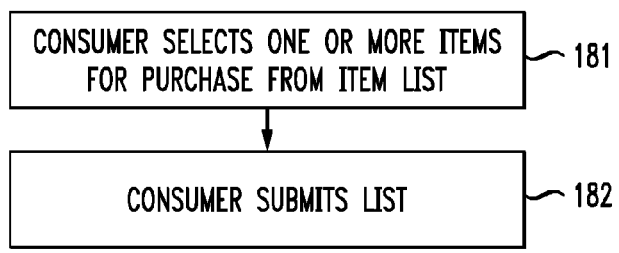
FIG. 8 is a flowchart of illustrative steps performed by the consumer to buy items on a shopping list of the consumer.

In a particular embodiment, an individual consumer shops every week for essentially the same items, such that every week at a selected time, the "Weekly Shopping List" becomes available for the consumer's review prior to ordering. In this embodiment, the consumer requests that the system commence with submitting the "Weekly Shopping List" to auction automatically and order from the lowest bidder automatically. Alternatively, the consumer elects to review the list and possibly make revisions prior to placing the order. A specific example is the case where a consumer establishes a "weekly shopping list" that includes milk, eggs, and bread to be packaged and delivered to his home on Friday afternoons after 4:00 PM. The consumer programs the system to submit this list for auction on Friday mornings, accept the lowest bid on the list, and charge the consumer's credit card for the amount. Alternatively, the consumer programs the system to automatically submit the list for auction, but not to automatically purchase from the lowest bidder. Instead, the consumer may request that an e-mail or page, for example, be sent to alert the consumer that the bidding is complete, so that the consumer may consider the bids and make the final determination as to which bid he chooses to accept. This type of scenario takes into account the idiosyncrasies of consumers. The lowest monetary bid is not necessarily the best overall bid for an idiosyncratic consumer. For example, the lowest bid could include only generic items or it may require that the goods be picked-up rather than delivered. The system described herein allows the consumer to view multiple bids with multiple combinations of preferences. The consumer can enter as few or as many preferences as they wish, prior to submitting the list for auction. Finally, the consumer may wish to review the list prior to submission to auction. In order for a consumer to remove and/or add items from and/or to the list, there are multiple configurations of the system's user interface that are used to achieve these functions. For example, on a Webpage, PDA screen, or the like in a preferred embodiment of the present invention, next to each item, there is a box which when checked indicates either (a) do not include this item in the list submitted to auction or (b) include this item in the list submitted to auction. Whether the configuration is (a) or (b) is a matter of designer preference. After the list is reviewed by the consumer and the appropriate boxes are selected, per step 181 of FIG. 8, then the consumer submits the list to auction, per step 182.

In an alternate embodiment, instead of or in addition to weekly, bi-weekly, monthly, etc. shopping lists, a second type of list may be a specialty list, such as "Holiday Shopping List" or "Barbecue Shopping List." These lists contain items that the consumer usually buys in preparation for a special event. The disclosed system will store these lists for call-up by the consumer and then, depending on the commands of the consumer, may perform any of a number of programs on the specialty list. For example, the system could submit the list "as is" for auction or the system could compare the list with the "Weekly Shopping List" to determine if there are overlapping items.

In addition to storing the various lists of an individual consumer, to allow for review and comparison in order to compile the most complete list for the consumers needs, the system also aids the consumer in forming his/her list by offering easy access to product information and/or pre-formed list information (e.g., recipes). For example, a website established for forming the consumer's lists, includes links to particular product or recipe sites. Multiple search engines may be provided to aid the consumer in making selections for his/her lists. For example, a search blank may be provided on the webpage wherein a consumer can enter, for example, the word "beef" and be presented with multiple types of beef products, e.g., ground beef, rib-eyes, tenderloins, flank steak, etc. with descriptions of each to aid the consumer in selecting an appropriate cut of beef. Additionally, the consumer may be provided with a selection of brand names associated with a particular type of product and/or recipes that utilize the selected product. One skilled in the art recognizes the many variations in search parameters that are useful for locating product information.

In a further embodiment of the disclosed system, a visual configuration of goods referred to as a virtual aisle is implemented as a navigational tool. Resembling, in the grocery store context, an aisle in a store, the system provides the consumer with a virtual aisle of types of goods. In an embodiment of the disclosed system, the virtual aisle is a navigable presentation of hypertext, icons and images, representing types of goods. One skilled in the art recognizes the multiple, technologically varied virtual aisle configurations that are within the scope of the disclosed system. The consumer selects a particular brand or type of good to add to his/her list. For example, a consumer has a recipe that calls for a spicy olive. Using the virtual aisle navigational tool, the consumer types in "olives" or "spicy olives" into a search window provided on the webpage and a shelf is called up that includes all olive products and depending on design choice, other olive-related products (e.g., salty snacks, martini mix). In an embodiment of the disclosed system, it is possible for the consumer to access further information (e.g., dietary and nutritional information, ingredients or other information offered by the product manufacturer) about a product in order to aid the consumer in forming his/her list. This information may be provided through various links (to e.g., the Uniform Code Council ("UCC"), AC Nielson, 1-800-database, Multi-Ad, Informational Resources Inc. ("IRI")) provided in conjunction with the product listing. Consequently, the consumer is provided with a plethora of information about, for example, spicy olives, from which the consumer is able to make an informed decision about which spicy olive is right for the consumer's needs. It is not necessary to explain the numerous informational linking capabilities of a network-based (e.g. Internet) value discovery system, as one skilled in the art recognizes the many variations that are within the scope of the disclosed system.

In addition to the list-forming functions discussed above, the disclosed system also offers an icon, indicative of the value discovery website, which aids a consumer in recognizing products which may be added to his/her shopping list and gives the consumer an easy way to add the product to his/her list without having to enter the value discovery website, call-up the list, and enter the product name.

Referred to as the "buy-side icon," consumers who use the value discovery system may download, or otherwise install, an icon software application, wherein an icon is displayed on the graphical user interface of the consumer's network interface. Selecting this icon enables the consumer to access and tender his/her list(s) from whatever device they choose and from wherever they may be using the device. Consequently, as technology extends Internet access beyond the desktop, the buy-side icon enables consumers to manage their lists using, for example, cellular phones and other wireless devices, kitchen-based network appliances like the I-OPENER or touch screens on refrigerators, interactive television and car-based network access. According to embodiments of the disclosed system, the value discovery system is available wherever consumers find it convenient to do their shopping.

Figure 3:
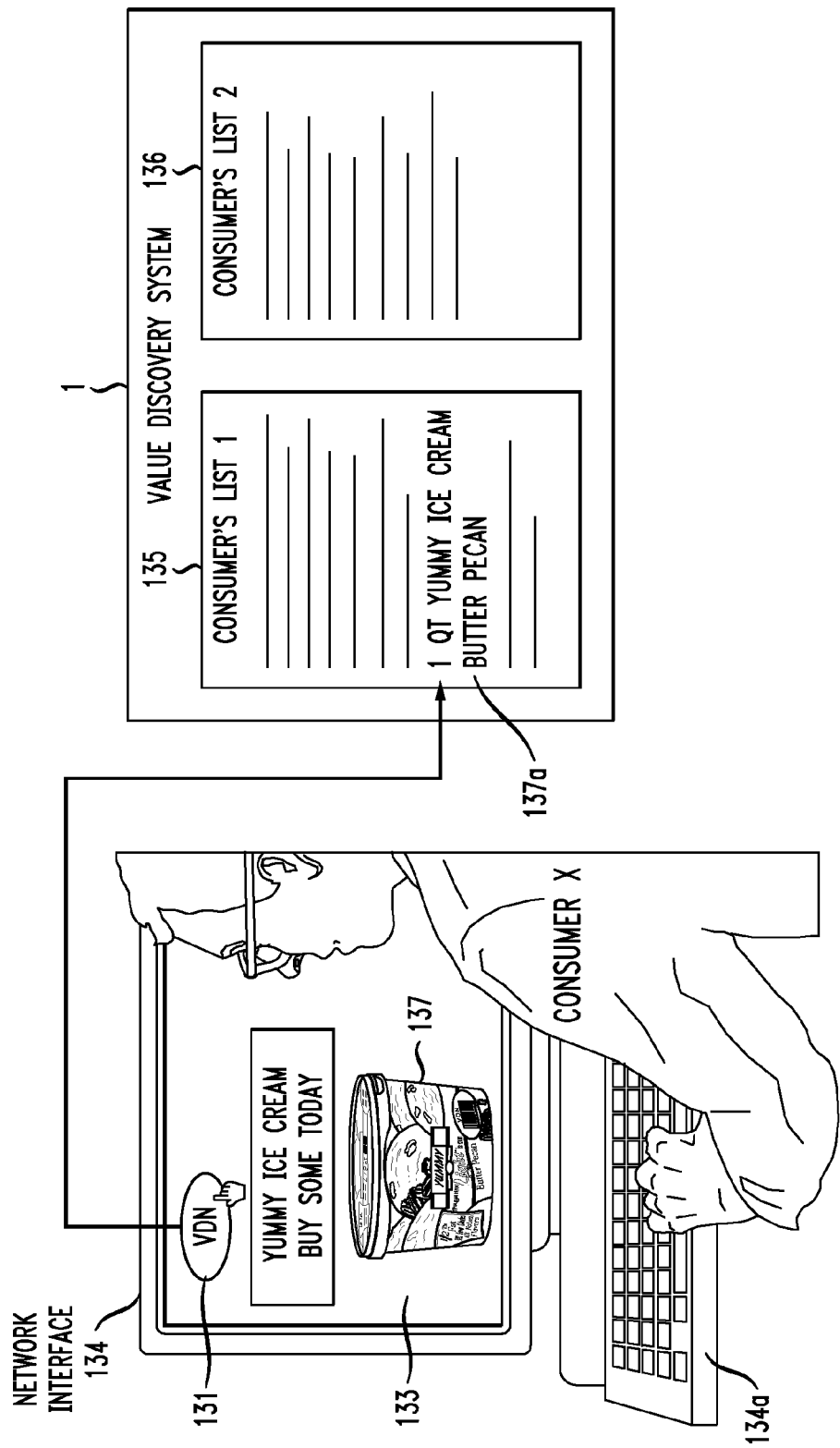
FIG. 3 shows a consumer's use of a sell-side icon to place items on a shopping list of the consumer.
Figure 4:
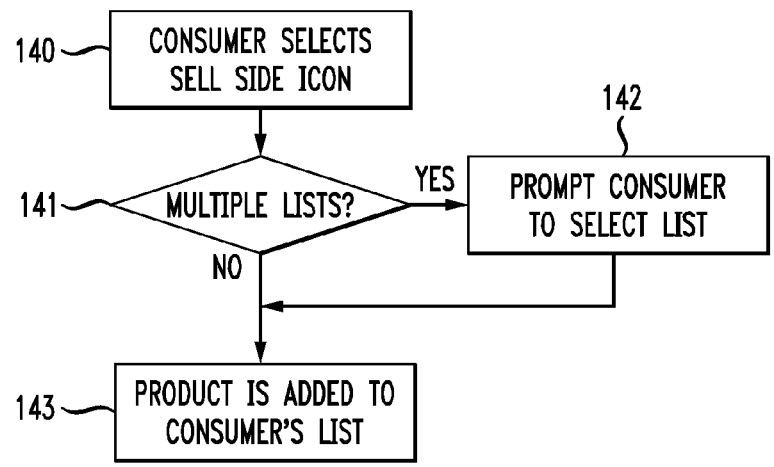
FIG. 4 is a flowchart of steps that can be performed in carrying out the use of the sell-side icon per FIG. 3.

Similarly, referred to as the "sell-side icon," bidder/sellers, product manufacturers, and advertisers are provided with icon enabling software for use with the value discovery system of the present invention. As shown in FIGS. 3 and 4, and as discussed more fully below, the sell-side icon 131 permits consumers to interact with an ad or promotional offer and place the featured products, e.g. Yummy Ice Cream 137 on their lists for future disposition. The icon turns an array of passive media into effective direct marketing. The sell-side icon makes every product SKU a potential revenue stream, and the use of the icon a standard line item on every marketing and advertising budget.

Figure 5:
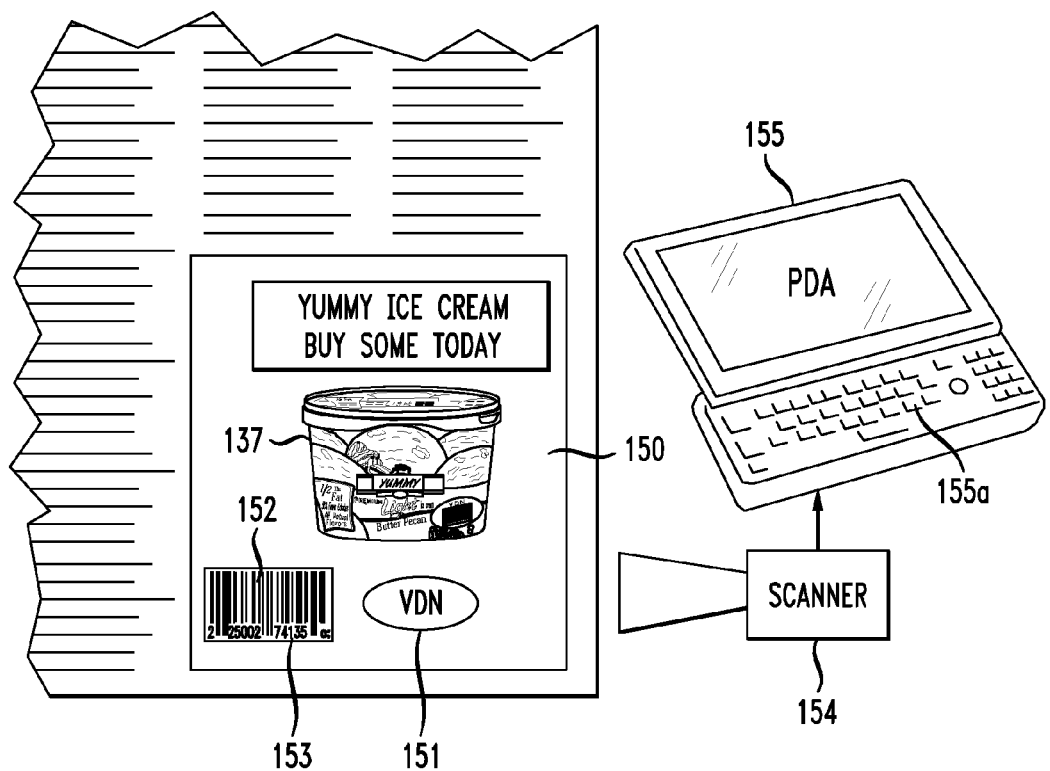
FIG. 5 depicts an advertisement for a product, the advertisement having a barcode and/or other identifying code thereon, whereby the product can get added to a shopping list of the consumer.
Figure 7:
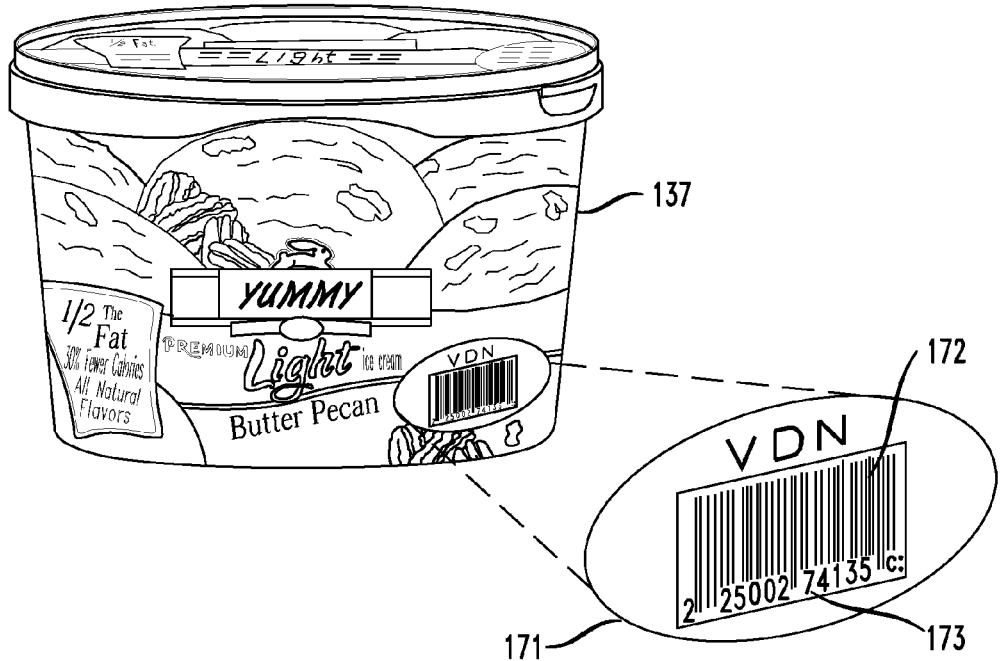
FIG. 7 depicts a product, the product having a barcode and/or other identifying code thereon, whereby the product can get added to a shopping list of the consumer.

In an alternate embodiment, the "sell-side icon" is not strictly software-based, but rather is found throughout any and all types of advertising mediums as illustrated in FIG. 5 as well as on the items themselves, as illustrated in FIG. 7. An icon located on a non-network linked medium, such as icon 151 in FIG. 5 and icon 171 in FIG. 7 has an item barcode or other identifying code located thereon, such as barcode 172 and other identifying code 173 in FIG. 7, and such as barcode 152 and other identifying code 153 in FIG. 5 or in close proximity thereto and this barcode or identifying code can be scanned (e.g., optically) or the alphanumeric characters can be entered manually by the consumer into the network. The network interfaces are equipped with keyboards, such as keyboard 134a of network interface 134 discussed hereinbelow, or alphanumeric keypads, such as alphanumeric keypad 155a of PDA 155 discussed below, for entering such identifying codes manually. Consequently, the icon indicates to a consumer that the manufacturer, advertiser, or bidder/seller of an item is affiliated with the value discovery system and the identifying codes embedded therein allow the consumer to easily add the item to the consumer's list.

According to representative embodiments of the present invention, and with reference again to FIG. 3 as well as FIG. 4, the consumer X can simply select the icon 131, per step 140, in the case of a product 137 offered on a website (e.g., through a web-banner or on a website other than the value discovery website) and the icon links to the value discovery system 1 and adds the product 137 to the consumer's list 135, per step 143, the added list entry being denoted 137a. If the consumer has multiple lists, e.g. weekly shopping list 136 in addition to list 135, then, per step 141, the value discovery website prompts the consumer to select to which list the consumer desires to add the product, per step 142. Alternatively, the rules of the value discovery website may automatically put the product into the "Weekly Shopping List."

Figure 6:
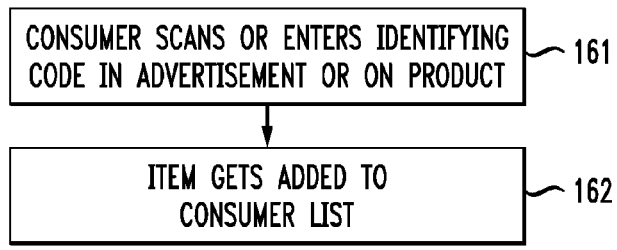
FIG. 6 is a flowchart of steps that can be performed in conjunction with the scenario depicted in FIG. 5.

With reference to FIGS. 5 and 6, a consumer may also find the icon 151 on the pages of a magazine or in a newspaper advertisement 150. Next to the icon 151 and the product is a bar code 152 and other identifying code 153. Using a bar code scanner 154 (e.g., attached to a PDA 155), the consumer is able to add the product to his/her auction list by scanning the bar code. Further, using interactive TV, the icon may appear on television advertisements for various products. Using an interactive remote, the consumer may add the product on the screen to his/her shopping list(s). As will be clear from what follows hereinbelow, the process depicted in FIG. 3 can be understood to depict such an interactive TV implementation in addition to its depiction of a website implementation, as described above.

A particular system example for allowing a consumer to use interactive TV and icon-linking technology to add products to the consumers list includes at least an interactive TV receiver, multiple servers, a modem, and an interactive remote for the main components. Referring to, for example, U.S. Pat. No. 6,075,527, incorporated herein by reference in its entirety, one skilled in the art recognizes the multiple components that may be utilized to establish an interactive television system. In an embodiment wherein the manufacturer of a product provides the icon through the interactive TV system, the manufacturer, for example, can include the icon as one of multiple data streams in a composite data stream (e.g., embedded data stream) that is broadcast as part of an advertisement. U.S. Pat. No. 6,097,441 offers a detailed description of the data stream technology and is incorporated herein by reference in its entirety. The consumer's interactive TV receiver is capable of receiving and separating complex data streams that include, for example, text, audio, video, and Internet data streams. Consequently, the projected image on the TV screen includes the advertisement, in addition to the icon, located in, for example, the corner of the TV screen. Using the interactive remote, the consumer may select the icon. Further, by selecting this icon, the system is designed to dial-up a modem connection over a designated telephone line or over a pre-established digital subscriber line (DSL) or access an "always on" broadband link and connect to multiple potential servers, including, the value discovery website server, the broadcasting server, and ultimately, the manufacturer's server in order to identify the consumer's selection of the icon. Further, the interactive TV receiver tags the transmitted information with an identifier that is unique to the consumer, so that the value discovery website server is capable of adding the selected product to the consumer's individual list. This is but one example of how the icon-linking process may occur. One skilled in the art recognizes the many possible variations in both system construction and methodology.

According to particular embodiments of the disclosed system, once a consumer submits a list of goods, including any and all preferences, e.g., distance, fulfillment method, etc., all registered bidder/sellers qualifying under the consumer's designated preferences are able to bid on the list. When the list is submitted to the value discovery auction engine, the registered bidder/sellers respond to that list through bidder-seller specific, pre-defined bidding rules that the individual bidder/sellers have placed with the value discovery auction engine. Using these pre-defined bidding rules and the auction decision rules, the value discovery auction engine generates a number of bids for the consumer to compare. The bidder/sellers are free to change their pre-defined bidding rules at any point, and are constrained only by the requirements set forth through the auction decision rules. The value discovery system is open to any and all types of bidder/sellers. Any firm that qualifies under the consumer's preferences and that is capable of providing the list of goods or a list comparable thereto, can bid on the list. For example, in the case of supermarket type goods, possible bidder/sellers include independent firms having only one location (e.g., neighborhood bodega) to nationwide grocery store chains (e.g., Safeway, Trader Joe's, Albertsons) to non-traditional firms, such as, CVS, Wal-Mart, K-Mart, Target, Price Club, Costco, and even gas-stations (e.g., Exxon's TigerMart) which are currently entering the grocery market on smaller scales. For example, where supermarkets sell health and beauty or general merchandise in addition to food items, modernized drugstores sell fresh milk and bread, gas station-based convenience stores sell home meal replacement items, and chains like Target and K-Mart sell a wide variety of non-perishables. Further, all of these entities deal with wholesalers who are themselves potential bidder/sellers. Wholesalers already have the capability to deliver pre-packed bins of non-perishable, refrigerated and frozen goods. Utilizing the system and method of the disclosed system, these bins are immediately ready for consumer pickup or home delivery, a distinct improvement in fulfillment over the traditional consumer labor required by traditional supermarkets. As a point of reference, approximately 7500 SKUs make up 80 percent of consumers' grocery-type purchases, making implementation of these new partnerships feasible.

In addition to the bidder/sellers who actively participate in the value discovery system and process, in a further embodiment, includes intelligent agents for performing searches of non-participating on-line stores and formulate bids for consumer's lists from these stores. The intelligent agents use robots or "bots" to go out and gather information from other sites. If a non-participating vendor is online and can potentially service a consumer's list, the intelligent agents, through the bots, can go out and scan the site of the non-participating potential bidder/seller and formulate a bid so that the consumer can see what that list is going to cost at non-participating as well as participating vendors.

In this case, the non-participating store will not be able to offer a value proposition customized to that consumer, because they are not actually participating in the system, but the bid price provided by the intelligent agents will offer bids for comparison with those from participating stores, thus allowing the consumers to accurately value the list that they have formulated. While these bids could possibly be the best from the perspective of an individual consumer, in all likelihood, bids formulated by the intelligent agents, based on non-participating firms, will be the least desirable due to the fact that there will be no individualized incentives offered to entice the consumers. Consequently, beyond just being an informational service, the bids gathered by the intelligent agents, when compared with the bids offered by the participating firms, tend to make the bids of the participating firms more attractive and simultaneously assure the consumers that they are getting the best deal for their proffered list(s).

In an embodiment of the disclosed system, in addition to meeting all or at least some of the requirements set forth in a consumer's list(s), the bidder/sellers offer additional incentives to the consumer in order to make their individual bids more attractive to an individual consumer. While some incentives are blanket incentives that are offered across the board with each bid (e.g., buy one 4-pack of Charmin Ultra, get a second for ½ price) other incentives are individualized to the consumer based on information gleaned from the consumer's current list, and or the consumer's list history. For example, a bidder/seller tracks the purchasing preferences of a particular consumer and offers free products or reduced-price products based on these preferences to this particular consumer. A specific example is a consumer who repeatedly purchases different types of cookies. As an incentive to convince that consumer to accept its bid on the consumer's current or even future list(s), bidder/seller X offers 2 free boxes of cookies with acceptance of bidder/seller X's bid. The number and types of incentives are limited only by the resources of the bidder/seller, but examples include coupons, free goods, cash-back and loyalty or other reward-type programs (e.g., 1,000 air mile points on this purchase). The bidder/sellers may also make their individual bids more attractive by offering helpful service-type suggestions along with their bids. For example, a consumer may submit a list of 20 goods, citing specific brand preferences for 5 of the goods. Bidder/seller X provides a bid for the 20 goods including the 5 brand preferences, but alternatively, provides an alternate bid should the consumer decide that the 5 brand preferences are not a requirement (e.g., an alternative brand is on sale or a generic brand is cheaper). Further as an incentive service, bidder/seller X may offer related goods suggestions based on the preferences of the individual consumer.

Using message boards and chat rooms, the disclosed system offers consumers an easy way to communicate the consumer's likes and dislikes about the products, including the manufacturers of the products, the bidder/sellers, and the system itself. This type of information is invaluable in aiding a consumer with the selection of items to add to his/her list as well as to deciding between bids from different bidder/sellers. In an embodiment of the disclosed system, the message boards for posting consumer evaluations are constructed so as to only be accessible to those who have actually made a purchase from a particular bidder/seller or manufacturer. For example, when a consumer wishes to put a message about a particular bidder/seller or manufacturer on a message board, the message board requires the consumer to select the particular bidder/seller or manufacturer from, for example, a drop-down menu and to enter a system issued identification ("ID") (e.g., a password). Using the ID, the system can pull up the transactions corresponding to the ID and compare the transaction data (e.g., bidder/sellers and/or manufacturers previously used) with the selected bidder/seller or manufacturer. Assuming there is a match, the system allows the consumer to post a message about this particular bidder/seller or manufacturer and stores the message under a heading that is the name of the bidder/seller or manufacturer, so that potential consumers can access the comments for any bidder/seller or manufacturer via this heading.

In a specific, exemplary implementation of the previously described embodiments, Consumer X is a registered consumer with a value discovery system according to the above-identified embodiments. Consumer X usually transacts using the touch screen "netpliance" mounted on his/her kitchen counter. On this particular day, however, an early meeting precludes Consumer X from submitting his/her list before leaving for work, so Consumer X uses his/her web-enabled Palm Pilot instead. Consumer X clicks on the auction icon on his/her Palm Pilot and then on his/her stored "Weekly Shopping List." The list contains twenty-five items. Two days earlier, Consumer X saw a newspaper ad with a manufacturer's offer for a fifty percent discount on a new kind of premium ice cream. The ad included the auction icon link, so Consumer X used his/her Palm Pilot's barcode reader at that time to add the item to his/her list. Consumer X clicks the "check them all except" button on the auction interface screen and then specifies which items on the list he/she does not want this week.

Normally Consumer X would submit his/her list at this point. As it happens, Consumer X is planning a dinner party for this week, so he/she goes to the recipe section and types "dinner Thai noodles Italian veal" in the search window. After reviewing the resulting recipes, the consumer saves two and clicks the ingredients from the recipes onto his/her list. Once again he/she hits the "check them all except" and checks product Y as something he/she already has and doesn't need.

Consumer X specifies a brand or brands for each item, and indicates those items (if any) for which she will accept substitutions (e.g. private label). Consumer X also specifies his/her fulfillment preferences. Consumer X chooses to hear from bidder/sellers who can provide home delivery, those who provide nearby drive-through or walk-in pickup of a pre-packed order, and from those stores within a 1.5 mile radius of his/her home where Consumer X will pick the items off the shelves himself/herself.

Bidder/Sellers respond automatically to Consumer X's list using the disclosed system, including the system's pre-defined bidding rules. While the bidder/sellers don't know who Consumer X is, they know Consumer X's profile based on Consumer X's thirty-five previous uses of the list. This data enables the bidder/sellers to construct an offer that is both appealing to Consumer X and profitable to them.

By way of example, bidder/seller #1 offers home delivery of the list for $85. Bidder/Seller #2 offers the list for $81 to be picked up at a convenience store located at a gas station 1 mile from his/her home. Bidder/Seller #2 also offers a buy one, get one free coupon for a car wash at the gas station. Bidder/Seller #3 offers to fulfill the list for $74 and offers a $5 discount plus 1000 bonus loyalty card points and 1000 free miles for her existing Delta Airlines account the next time Consumer X chooses #3 for a transaction that is greater than $60. Bidder/Seller #4 takes full advantage of Consumer X's willingness to accept private label substitution and bids $68. Consumer X's historical shopping profile shows a partiality to salty snack foods, so bidder/seller #4 also offers to throw in three free bags of its private label gourmet tortilla chips. Bidder/Sellers #3 and #4 require Consumer X to pick the items himself/herself at their stores. Finally, the system's retrieval technology (e.g., via intelligent agents) retrieves prices for Consumer X's list from Acme, a non-participating online vendor with a store one mile from Consumer X's house. Due to the lack of information, Acme's bid is higher, $98.

Consumer X compares the competing offers, selecting the one (if any) that delivers the best value (price, convenience, future benefits etc.) to him/her, based on his/her definition of value. Consumer X checks the community message boards to see others' experience with these particular Bidder/Sellers. Consumer X chooses and either pays online with e.g., a credit or debit card or off-line (e.g., at the time Consumer X picks up the order, when the order is delivered).

The particular embodiment described above is but one example resulting from the disclosed system and process. This example is not meant to be limiting in any way and one skilled in the art recognizes the many possible variations that fall within the scope of this invention.

Although many of the examples described above refer to lists comprised of household consumables (e.g., groceries) as the example of WAGs which are easily put into list form and offered for bids in the reverse auction process of the disclosed system, there are any number of other categories of WAGs which may be the subject of the reverse auction process. For example, other markets for WAGs include, health and beauty, office products, and home improvement/hardware. In certain embodiments of the disclosed system, the shopping lists entered for reverse auction may in fact include products from any or all categories of products. Further, given the global accessibility and use of the Internet, embodiments of the disclosed system assume consumers, buyers/sellers, manufacturers, and advertisers from around the world.

An alternative embodiment of the disclosed system also includes a reverse auction system for use with products not normally considered to be WAGs, such as cars, electronics equipment, and services. Service products include, for example, telecommunications services (e.g., long-distance service, Internet service, wireless phone service, cable service).

The embodiments described above are not intended to be limiting. One skilled in the art can appreciate the myriad of embodiment variations that fall within the scope of the invention as set forth.

The invention claimed is:

1. A method for use by an information system including a server and at least one user computer, the method comprising:
   creating on a first website implemented by the server at least one item list for a consumer to be stored on the first website;
   when the consumer clicks on a sell-side icon displayed on a computer screen of the user computer used by the consumer, receiving, by the server, information associated with the sell-side icon clicked by the consumer, wherein the sell-side icon is associated with the first website but provided by a second website, different from the first website, and includes a code identifying a product offered for purchase on the second website;
   determining, by the server and based on the information received, receipt of an indication that the consumer wishes to add, to the item list stored at the first website, the product offered for purchase at the second website, the indication having been automatically transmitted to the server in response to consumer interaction with the second web site, such that the consumer can purchase the product on the first website;
   responsive to the received indication, adding, by the server, to the item list stored at the first website, the product offered for purchase at the second website as one item in the item list;
   after at least one item is added to the item list, receiving, by the server, a selection of an item from the item list by the consumer;
   displaying to the consumer multiple available sellers for the item to be purchased by the consumer; and
   completing a purchase of the item by the consumer from a seller, selected by the consumer, from the displayed multiple sellers.

2. The method of claim 1, wherein the sell-side icon for the product offered for purchase at the second website is not displayed on the first website.

3. The method of claim 2, wherein the product offered for purchase at the second website is a product offered on an interactive television system.

4. The method of claim 1, wherein the system is further arranged to store for the consumer at the first website at least a second item list, and wherein the method further comprises:
   adding the product offered for purchase at the second website to one of the first item list and the second item list based on a selection made by the consumer as to which of the at least first item list and the second item list the consumer wishes to add that product to.

5. The method of claim 1, wherein the indication that the consumer wishes to add, to the item list stored at the first website, the product offered for purchase at the second website is an indication that the consumer has caused to be transmitted to the server the code identifying that product.

6. The method of claim 5, wherein the code is on the product offered for purchase at the second website.

7. The method of claim 1, wherein the product offered for purchase at the second website is added to the item list stored at the first website without the consumer entering the first website.

8. A method for use by an information system including at least a server that implements a first website at which products are offered for purchase, the method comprising:
   a) creating, at the first website of the server, a plurality of item lists, at least ones of the plurality of item lists being each associated with a respective different one of a plurality of consumers,
   b) putting at least a first one of the products offered for purchase at the first website to a first item list, from the plurality of item lists, associated with a first consumer, in response to an indication from the first consumer that the first consumer wishes to add, to the first item list associated with the first consumer, the at least first one of the products offered for purchase at the first web site,
   c) putting at least a second one of the products offered for purchase at the first website to a second item list, from the plurality of item lists, associated with a second one of the consumers, in response to an indication from the second consumer that the second consumer wishes to add, to one of the item lists associated with the second consumer, the second one of the products offered for purchase at the first website,
   d) obtaining an indication that the first consumer wishes to add, to the first consumer's associated item list stored at the first website, at least a first product offered for purchase at other than the first website, this indication having been transmitted to the system in response to other than consumer interaction with the first website and including a first code identifying the first product,
   e) putting said at least first product offered for purchase at other than the first website to the first item list that is stored at the first website and is associated with the first consumer, in response to the indication received in accordance with d), such that the first consumer can purchase said at least first product on the first website,
   f) obtaining an indication that the second consumer wishes to add, to the second consumer's associated item list stored at the first web site, at least a second product offered for purchase at other than said first website, this indication having been transmitted to the system in response to other than consumer interaction with the first website and including a second code identifying the second product, and
   g) putting said at least second product offered for purchase at other than the first website to the second item list that is stored at the first website and that is associated with the second consumer, in response to said indication received in accordance with f), such that the second consumer can purchase said at least second product on the first website.

9. The method of claim 8, wherein the products offered for purchase at other than the first website are offered for purchase at a second website different from the first website.

10. A non-transitory computer-readable medium on which is stored software program that, when executed by a computer, causes the computer to:
   display a sell-side icon on a screen of the computer used by a consumer, the sell-side icon being associated with a first website implemented by a server, wherein the server creates on the first website an item list for the consumer,
   in response to the consumer selecting the sell-side icon while a page of a second website, different from the first website, is then also being displayed on the screen, send information associated with the sell-side icon to the server to cause a product then being offered on said page of the second website, corresponding to the sell-side icon, to be placed on the item list that is stored at the first website without any consumer interaction with the first website at that time, such that the consumer can purchase the product on the first website,
   after at least one item is added to the item list, receiving, by the server, a selection of an item from the item list by the consumer;
   displaying to the consumer multiple available sellers for the item to be purchased by the consumer; and
   completing a purchase of the item by the consumer from a seller, selected by the consumer, from the displayed multiple sellers;
   wherein the information of the sell-side icon includes a code identifying the product then being offered on said page of the second website.

11. The non-transitory computer-readable medium of claim 10 wherein, in the display of the sell-side icon, the sell-side icon is displayed in a corner of the screen of the computer.

12. A method by a computer for a consumer to communicate with a server, comprising:
   downloading, to the computer for the consumer, software program, stored on the computer as non-transitory computer-readable medium, that, when executed by the computer, causes the computer to:
   display a sell-side icon on a screen of the computer by the consumer, the sell-side icon being associated with a first website implemented by the server, wherein the server creates on the first website an item list for the consumer,
   in response to the consumer selecting the sell-side icon while a page of a second website, different from the first website, is then also being displayed on the screen, send information associated with the sell-side icon to the server to cause a product then being offered on said page of the second website, corresponding to the sell-side icon, to be placed on the item list that is stored at the first website without any consumer interaction with the first website at that time, such that the consumer can purchase the product on the first website,
   after at least one item is added to the item list, receive a selection of an item from the item list by the consumer;
   display to the consumer multiple available sellers for the item to be purchased by the consumer; and
   complete a purchase of the item by the consumer from a seller, selected by the consumer, from the displayed multiple sellers,
   wherein the information of the sell-side icon includes a code identifying the product then being offered on said page of the second website.

13. A method for use by an information system including a server and at least one user computer, the method comprising:
   creating on a first website implemented by the server at least one item list for a consumer to be stored on the first website;
   when the user computer receives information associated with a sell-side icon displayed on a product scanned into the user computer by the consumer, receiving, by the server, the information associated with the sell-side icon scanned by the consumer, the sell-side icon being associated with the firsts website and being provided by a seller corresponding to a bar code identifying a product offered for purchase by the seller;
   determining, by the server and based on the information received, receipt of an indication that the consumer wishes to add, to the item list stored at the first web site, the product offered for purchase by the seller, the indication having been automatically transmitted to the server in response to consumer scanning of the bar code corresponding to the sell-side icon;

responsive to the received indication, adding by the server, to the item list stored at the first website, the product offered for purchase by the seller, such that the consumer can purchase the product on the first web site;

after at least one item is added to the item list, receiving, by the server, a selection of an item from the item list by the consumer;

displaying to the consumer on the user computer multiple available sellers for the item to be purchased by the consumer; and completing a purchase of the item by the consumer from a seller, selected by the consumer, from the displayed multiple sellers.

14. The method of claim 13, further including:

loading the first website after the product is added to the item list and displaying, on the computer screen from the first website, the item list with addition of the product offered for purchase by the seller to the consumer.

15. The method of claim 13, wherein the server is further arranged to store for the consumer at the first website at least a second item list, and wherein the method further comprises:

adding the product offered for purchase by the seller to one of the first item list and the second item list based on a selection made by the consumer as to which of the at least first item list and the second item list the consumer wishes to add that product to.

16. The method of claim 13, wherein the product offered for purchase by the seller is added to the item list stored at the first website without the consumer entering the first website.

17. The method of claim 13, wherein:

the indication that the consumer wishes to add, to the item list stored at the first website, the product offered for purchase by the seller is an indication that the consumer has caused to be transmitted to the server the bar code identifying that product being scanned.

18. The method of claim 17, wherein the bar code is in an advertisement in one of a) a newspaper and b) a magazine.

* * * * *